(12) United States Patent
Hoelzl et al.

(10) Patent No.: US 9,317,801 B2
(45) Date of Patent: Apr. 19, 2016

(54) TRANSPONDER LABEL RESISTANT TO HIGH TEMPERATURES

(71) Applicant: Schreiner Group GmbH & Co. KG, Oberschleissheim (DE)

(72) Inventors: Gerhard Hoelzl, Fahrenzhausen (DE); Johannes Becker, Ilmmuenster (DE)

(73) Assignee: Schreiner Group GmbH & Co. KG, Oberschleissheim (DE)

( * ) Notice: Subject to any disclaimer, the term of this patent is extended or adjusted under 35 U.S.C. 154(b) by 0 days.

(21) Appl. No.: 14/566,925

(22) Filed: Dec. 11, 2014

(65) Prior Publication Data

US 2015/0178613 A1 Jun. 25, 2015

(30) Foreign Application Priority Data

Dec. 19, 2013 (DE) .......................... 10 2013 114 550

(51) Int. Cl.
| | | |
|---|---|---|
| G06K 19/02 | (2006.01) | |
| G06K 19/077 | (2006.01) | |
| B32B 37/12 | (2006.01) | |
| B32B 37/24 | (2006.01) | |
| B32B 38/10 | (2006.01) | |

(52) U.S. Cl.
CPC ............ *G06K 19/0776* (2013.01); *B32B 37/12* (2013.01); *B32B 37/24* (2013.01); *B32B 38/10* (2013.01); *G06K 19/02* (2013.01); *G06K 19/07722* (2013.01); *G06K 19/07771* (2013.01); *B32B 2037/243* (2013.01); *B32B 2307/306* (2013.01); *B32B 2519/00* (2013.01); *B32B 2519/02* (2013.01)

(58) Field of Classification Search
CPC ...... B42D 1/003; B42D 1/008; G06K 19/077; G06K 19/07701
USPC .......................................... 235/488, 492, 487
See application file for complete search history.

(56) References Cited

U.S. PATENT DOCUMENTS

| | | |
|---|---|---|
| 6,147,604 A | 11/2000 | Wiklof et al. |
| 6,486,783 B1 | 11/2002 | Hausladen et al. |
| 6,957,777 B1 | 10/2005 | Huang |
| 2002/0133942 A1 | 9/2002 | Kenison et al. |
| 2005/0059308 A1 | 3/2005 | Parsons |
| 2008/0084312 A1 | 4/2008 | Daily |

(Continued)

FOREIGN PATENT DOCUMENTS

| | | |
|---|---|---|
| CA | 2 345 883 A1 | 7/2002 |
| DE | 10 2005 026 559 A1 | 12/2006 |

(Continued)

*Primary Examiner* — Daniel St Cyr
(74) *Attorney, Agent, or Firm* — Collard & Roe, P.C.

(57) ABSTRACT

A transponder label resistant to high temperatures includes a transponder arrangement, an adhesive layer for adhesively attaching the transponder label to an electrically conductive substrate, and a spacer layer on which the transponder arrangement is disposed, to space it apart from the conductive substrate. The adhesive layer and the spacer layer each have a material that is temperature-resistant, in such a manner that the size of a surface area of the transponder label, which area covers the conductive substrate after the transponder label is adhesively attached to the conductive substrate, remains unchanged when the transponder label, after having been adhesively attached to the conductive substrate, is heated from a starting temperature below 125° C. to a higher temperature between 125° C. and 400° C., and, after having been heated, is cooled down to the starting temperature.

16 Claims, 2 Drawing Sheets

(56) References Cited

U.S. PATENT DOCUMENTS

| | | |
|---|---|---|
| 2009/0066518 A1 | 3/2009 | Tanaka et al. |
| 2010/0025481 A1* | 2/2010 | Brod ................ G06K 19/07722 235/492 |
| 2010/0219252 A1 | 9/2010 | Kikuchi et al. |
| 2012/0153968 A1 | 6/2012 | Forster |
| 2012/0162945 A1* | 6/2012 | Schreiner ............. H05K 3/0058 361/781 |
| 2012/0318874 A1 | 12/2012 | Germann et al. |

FOREIGN PATENT DOCUMENTS

| | | |
|---|---|---|
| DE | 20 2009 006 271 U1 | 7/2010 |
| DE | 10 2009 003 105 A1 | 11/2010 |
| DE | 10 2011 104 170 A1 | 12/2012 |
| EP | 1 018 702 B1 | 4/2010 |
| EP | 2 206 077 B1 | 6/2012 |
| EP | 2 084 654 B1 | 10/2012 |
| EP | 2 717 197 A1 | 4/2014 |
| WO | 2006/114632 A2 | 11/2006 |
| WO | 2007/110254 A1 | 10/2007 |

\* cited by examiner

FIG.5B

# TRANSPONDER LABEL RESISTANT TO HIGH TEMPERATURES

CROSS REFERENCE TO RELATED APPLICATIONS

Applicant claims priority under 35 U.S.C. §119 of German Application No. 10 2013 114 550.7 filed Dec. 19, 2013, the disclosure of which is incorporated by reference.

BACKGROUND OF THE INVENTION

1. Field of the Invention

The invention relates to a transponder label resistant to high temperatures, which is suitable for being placed onto a conductive subsurface to be painted. The invention furthermore relates to a method for marking a conductive subsurface to be painted, using a transponder label.

2. Description of the Related Art

To control a production sequence, marking of products that are processed within the scope of the production process is gaining increasing importance. Because control of the production sequence and transport of the products during the production sequence is increasingly taking place semi-automatically or completely automatically, it is necessary that the individual products can be automatically detected within a production line. For this purpose, transponder labels can be used, for example, that are applied to the products to be processed. Such a transponder label has a chip on which data that identify the product or the production sequence can be stored. The chip is connected with an antenna, by way of which the stored data can be wirelessly transmitted to a read/write device.

Because electromagnetic waves can be used for the data exchange between transponder label and reader, the data exchange can be impaired by electrically conductive components or an electrically conductive subsurface. Particularly if the transponder is applied to a metal surface, data exchange can be made difficult or actually impossible.

When using a transponder label for marking products in a manufacturing or production process, it must furthermore be ensured that the transponder label can withstand the stresses that occur during the individual production steps. The stress can be, for example, high temperatures to which the transponder label affixed to a product is exposed during production of the product. In a drying process at the end of a painting process of a conductive subsurface, for example part of a metallic auto body, high temperatures of more than 125° C. to as much as 400° C. can occur. A transponder label that is applied to the conductive subsurface to be painted before the painting process must withstand the high temperatures during the drying process of the paint after it has been covered with paint.

SUMMARY OF THE INVENTION

There is a need for providing a transponder label resistant to high temperatures, which is suitable for use on a conductive subsurface and withstands stress caused by high temperatures. A further concern of the present invention is to provide a method for marking a subsurface to be painted with a transponder label, wherein the transponder label withstands stress caused by high temperatures.

An embodiment of a transponder label resistant to high temperatures is described below in accordance with one aspect of the invention. According to a possible embodiment, the transponder label resistant to high temperatures comprises a transponder arrangement having a chip and an antenna structure connected to the chip, an adhesive layer for adhesively attaching the transponder label to an electrically conductive subsurface, and a spacer layer on which the transponder arrangement is disposed, to space it apart from the conductive subsurface, having an underside on which the adhesive layer is disposed. The spacer layer has a material that is temperature-resistant for temperatures such that the size of a surface of the transponder label, which surface covers the conductive subsurface after the transponder label has been adhesively attached to the conductive subsurface remains unchanged when the transponder label is heated from a starting temperature of below 125° C. to a higher temperature between 125° C. and 400° C. after it has been adhesively attached to the conductive subsurface, and, after heating, is cooled down to the starting temperature once again. The adhesive layer has a material that is temperature-resistant, such that loosening of the adhesive layer from the conductive subsurface is prevented once the transponder label has been adhesively attached to the conductive subsurface and the transponder label is heated to the higher temperature, after having been adhesively attached to the conductive subsurface, from the starting temperature to the higher temperature, and, after heating, is cooled to the starting temperature once again.

The conductive subsurface can be, for example, a metallic surface to which the transponder label is adhesively attached, which is subsequently painted. The transponder label is adhesively attached to the conductive subsurface at a starting temperature below 125° C., for example a temperature between 40° C. and 5° C., preferably at room temperature of approximately 23° C. After adhesive attachment has taken place, the conductive subsurface can be painted. For drying the paint, the conductive subsurface with the label adhesively attached to it can be heated to the higher temperature between 125° C. and 400° C., preferably to an elevated temperature between 180° C. and 240° C. Subsequently, the conductive subsurface with the transponder label applied to it is cooled back down to the starting temperature. The materials of the spacer layer and of the adhesive layer are temperature-resistant for the indicated temperature cycle, such that shrinkage of the label during cooling and loosening of the adhesive layer from the conductive subsurface are prevented.

In the transponder label, the spacer layer guarantees that the radio frequency identification (RFID) functionality of the label is maintained when the label is applied to conductive surfaces. For this purpose, the spacer layer can have an electrically insulating, dielectric material.

For the individual layers of the transponder label, materials are used that ensure that in the individual layers or between the layers, almost no tensions occur or tensions are greatly attenuated when heating to high temperatures of more than 125° C. to as much as 400° C. takes place, preferably when heating to temperatures in a range between 180° C. and 240° C. takes place, if the label is exposed to these temperatures and subsequently cooled back down to the starting temperature below 125°, preferably to temperatures below 40° C. The spacer layer can contain a heat-resistant foamed plastic, particularly a polyurethane foam, a soft resin or an acrylate foam.

According to a further possible embodiment, the spacer layer can be made available in the form of a flexible panel of polyurethane. In comparison with a polyurethane foam, a polyurethane panel refers to a non-foamed polyurethane, which is comparable with a rubber band in terms of its elasticity. The acrylate foam is an adhesive in foamed form, which can harden. The spacer layer can contain polyamide and/or a polytetrafluoroethylene (available under the trademark TEFLON) core and/or other thermoplastics, duroplastics, and elastomers suitable for high-temperature use. By using such a spacer layer between the transponder arrangement and the conductive subsurface, the result can be achieved that during heating and cooling of a product to which the transponder label is adhesively attached, almost no tensions build up in the material of the spacer layer, when the transponder label, in the adhesively attached state, is exposed to temperatures of more than 125° C. to as much as 400° C., and subsequently cooled back down to the starting temperature.

The adhesive layer has materials that ensure that the transponder label securely adheres to the conductive subsurface, particularly under the influence of high temperatures of more than 125° C., and during subsequent cooling down to the starting temperature. The adhesive layer can contain an acrylate adhesive, particularly a pure acrylate or a modified acrylate, for example. Furthermore natural rubber adhesives can be used for the adhesive layer, which also demonstrate great temperature resistance.

The materials used for the adhesive layer and for the spacer layer are coordinated with one another in such a manner that the heat resistance of the adhesive layer is high enough so that sufficient adhesive strength toward the conductive subsurface continues to be present even if the transponder label or the conductive subsurface is heated to a high temperature of more than 125° C. to as much as 400° C. and preferably to temperatures between 180° C. and 240° C., and subsequently cooled back down to the starting temperature below 125° C., preferably to a temperature between 40° C. and 5° C. or to room temperature, so that loosening of the transponder label during the high-temperature stress and the subsequent cooling is prevented. Furthermore, the expansion coefficients of the spacer layer and the adhesive layer are coordinated with one another in such a manner that after the label has been adhesively attached to the conductive subsurface, during heating to the elevated temperature and during subsequent cooling back down to the lower initial temperature, no tensions form in the materials, in each instance.

The materials of the adhesive layer and the spacer layer are selected in such a manner that particularly during a drying process of a paint, which has been applied to a conductive surface to which the transponder label has been adhesively attached, no paint-free locations of the subsurface occur. The materials of the adhesive layer and the spacer layer are selected in such a manner that after the label is adhesively attached to the conductive subsurface, and the label is heated from the starting temperature to the higher temperature, and the subsequent cooling down to the starting temperature, in the temperature ranges stated above, material shrinkage, particularly of the spacer layer but also of the adhesive layer, does not come about.

In this way it is guaranteed that the complete surface area of the conductive subsurface, to which the transponder label was adhesively attached at a comparatively low temperature before painting, is completely covered by the transponder label even after the painting and drying process. With the transponder label, it is therefore possible to prevent the transponder label from retracting from the originally covered surface area as the result of a shrinkage process of the materials of the label due to the temperature stress that occurs during heating and cooling, and exposing unpainted material.

Furthermore, the materials used for the individual layers of the transponder label are selected in such a manner that the formation of cracks in the material structure is prevented during heating of the label to temperatures between 125° C. and 400° C., preferably between 180° C. and 240° C., and the subsequent cooling to temperatures below 125° C., preferably to room temperature of approximately 23° C. For this purpose, the expansion coefficients of the materials used, in particular, are accordingly coordinated with one another.

According to a possible embodiment, a transponder protection layer can be provided above the transponder arrangement, to protect the transponder arrangement. The transponder protection layer can be fixed in place on the transponder arrangement or the spacer layer using an adhesive layer. The transponder protection layer can be configured for imprinting of the transponder label. The transponder protection layer has materials that are heat-resistant for heating to temperatures between 125° C. and 400° C., preferably between 180° C. and 240° C., and for subsequent cooling down to the starting temperature below 125° C., preferably between 40° C. and 5° C., on the one hand, and additionally offer the possibility of imprinting.

According to a possible embodiment, a laser-inscribable film can be used for the transponder protection layer. The laser-inscribable film can be inscribed by means of blackening using a laser. The transponder protection layer can have a laser-removable layer that is covered by a transparent laminate film. As a result, release or evaporation into the environment of a burned-off substance during laser inscription can be prevented.

According to a further possible embodiment of the transponder label, a paint protection layer, over which painting is possible, can be affixed above the transponder protection layer. As a result, it is possible to apply the transponder label to a conductive subsurface to be painted. The paint protection layer can be configured in such a manner that after painting and subsequent drying of the paint, the paint protection layer can be pulled off from the inscribed transponder protection layer, so that the inscription of the transponder protection layer, which was painted over at first, is visible again.

The paint protection layer can be coated with a further adhesive layer on its underside. The adhesive strength of this further adhesive layer is coordinated with the transponder protection layer in such a manner that pulling the paint protection layer off from the transponder protection layer is possible without residues remaining on the transponder protection layer. The adhesive strength of the further adhesive layer can be lower, for example in comparison with the adhesive strength of the adhesive layer with which the spacer layer is adhesively attached to the conductive subsurface. Because the further adhesive layer between the transponder protection layer and the paint protection layer is also exposed to the high temperatures that occur during the drying process of a paint layer, and to the temperature variations during heating and cooling, the further adhesive layer also has materials that are temperature-resistant for temperatures between 125° C. and 400° C., preferably between 180° C. and 240° C., and for subsequent cooling down to the starting temperature below 125° C., preferably between 40° C. and 5° C.

Various antenna shapes and constructions can be used for the antenna connected to the chip of the transponder arrangement. The antenna can be a strip conductor antenna. The antenna can be disposed on the surface of the spacer layer, for example. According to another embodiment, three-dimensional antenna structures also can be used. The transponder label can have an antenna structure, for example, that is disposed in part on a top side of the spacer layer and, after having been folded to the side, around the spacer layer, in part on the underside of the spacer layer, on which the adhesive layer is provided. Furthermore, the antenna structure can be configured as a pennant that stands away from the spacer layer.

An embodiment of a method for marking an electrically conductive subsurface to be painted with a transponder label is described below in accordance with another aspect of the invention. According to the method, a transponder label resistant to high temperatures is provided according to one of the embodiments indicated above. The transponder label is applied to the electrically conductive subsurface to be painted by means of the adhesive layer of the transponder label. A paint layer is applied to the conductive subsurface. The transponder label is painted over with the paint layer. The paint layer is dried by heating it to a temperature between 125° C. and 400° C., preferably to a temperature between 180° C. and 240° C. Subsequently, cooling to an initial temperature below 125° C., for example to a temperature between 40° C. and 5° C., preferably to room temperature of approximately 23° C., can take place.

On the basis of the materials used for the spacer layer and the adhesive layer, it is ensured that the transponder label is able to function on an electrically conductive subsurface, and furthermore is heat-resistant when heated to high temperatures, particularly temperatures between 125° C. and 400° C. and preferably to temperatures between 180° C. and 240° C., and subsequent cooling down to the starting temperature below 125° C., for example a temperature below 40° C., in such a manner that shrinkage of the individual layers of the label on the conductive subsurface, for example during a drying process of a paint that has been applied to the conductive subsurface, is prevented. When using the transponder label resistant to high temperatures for marking a conductive subsurface to be painted, it is thereby guaranteed that even after the drying of the paint, in which heating to the stated high temperatures between 125° C. and 400° C. and subsequent cooling to the initial temperature can occur, no paint-free locations of the subsurface occur, which could be formed as the result of material shrinkage of the materials of the individual layers of the transponder label.

BRIEF DESCRIPTION OF THE DRAWINGS

Other objects and features of the invention will become apparent from the following detailed description considered in conjunction with the accompanying drawings that show exemplary embodiments of the present invention. It is to be understood, however, that the drawings are designed as an illustration only and not as a definition of the limits of the invention.

In the drawings, wherein similar reference characters denote similar elements throughout the several views.

DETAILED DESCRIPTION OF PREFERRED EMBODIMENTS

Figure 1:
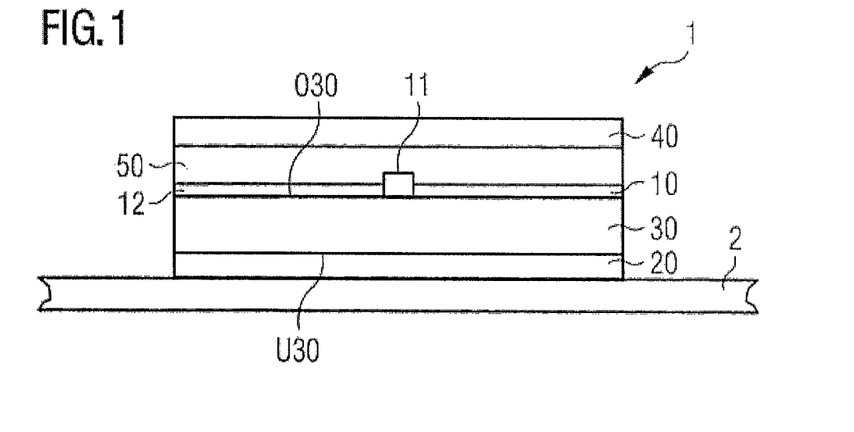
FIG. 1 shows a first embodiment of a transponder label resistant to high temperatures.

Turning now in detail to the drawings, FIG. 1 shows a first embodiment of a transponder label 1 resistant to high temperatures, which is suitable for being adhesively attached to a conductive subsurface. Because of the heat resistance of the material used for the individual layers of the transponder label, the transponder label is particularly suitable for use at temperatures between 125° C. and 400° C., as they occur, for example, during a drying procedure of a paint that has been applied to a conductive subsurface during a painting procedure.

The transponder label 1 resistant to high temperatures comprises a transponder arrangement 10 having a chip 11 and an antenna structure 12 connected to the chip. Furthermore, the transponder label 1 has an adhesive layer 20 for adhesively attaching the transponder label 1 to a conductive subsurface and a spacer layer 30 on which the transponder arrangement 10 is disposed. The spacer layer 30 serves for spacing the transponder arrangement apart from the conductive subsurface and has an underside U30, on which the adhesive layer 20 is disposed. The transponder label can furthermore have a transponder protection layer 40 for protecting the transponder arrangement 10. An adhesive layer 50 can be disposed between the spacer layer 30 and the transponder protection layer 40. According to a possible embodiment, the transponder protection layer 40 can be inscribable. The transponder protection layer 40 can be imprintable or inscribable by means of a laser, for example.

The spacer layer 30 can be directly coated with the adhesive layer 50 on its top side O30. The spacer layer 30 can be configured to be self-adhesive on its top side O30. A non-self-adhesive transponder arrangement can then be disposed on the top-side, self-adhesive spacer layer 30. According to an alternative embodiment, the adhesive layer 50 can be applied to the transponder arrangement 10. The self-adhesive transponder arrangement 10 can be disposed as an inlay on the spacer layer 30, which itself is not adhesive.

To protect the adhesive layer 20, a protective film (liner) 2 can be disposed on an underside of the label. The protective film 2 can be made available as a web of material on which multiple transponder labels 1 are situated disposed next to one another. The protective film 2 can consist either of a plastic film or a web of paper, to which an adhesive-repelling substance has been applied, if necessary.

Figure 2:
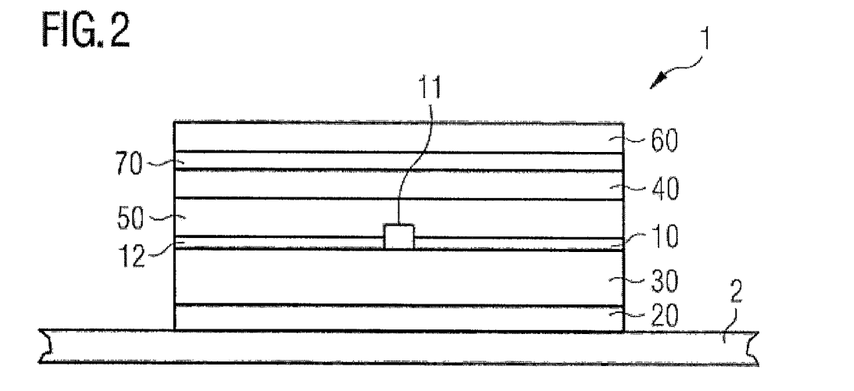
FIG. 2 shows a second embodiment of a transponder label resistant to high temperatures.

FIG. 2 shows a second embodiment of a transponder label 1 resistant to high temperatures, which is also suitable for use on a conductive subsurface, and withstands heating from an initial temperature below 125° C., for example temperatures between 40° C. and 5° C., to high temperatures between 125° C. and 400° C., and subsequent cooling down to the initial temperature. The transponder label according to FIG. 2 has not only the transponder arrangement 10 already shown in FIG. 1, with the chip 11 and the antenna structure 12, the adhesive layer 20, the spacer layer 30, the transponder protection layer 40, and the adhesive layer 50 disposed between the spacer layer 30 and the transponder protection layer 40, but in addition, a paint protection layer 60 for protecting the transponder protection layer 40 during painting over the transponder label. The transponder label furthermore comprises an adhesive layer 70, which is disposed between the paint protection layer 60 and the transponder protection layer 40.

According to a possible embodiment of the transponder label resistant to high temperatures shown in FIG. 2, the adhesive strength of the adhesive layer 70 between the paint protection layer 60 and the transponder protection layer 40 is lower than the adhesive strength of the adhesive layer 50 between the spacer layer 30 and the transponder protection layer 40. As a result, it is guaranteed that the paint protection layer 60 can be pulled off from the transponder protection layer 40 without residues after the transponder label has been painted over.

Figure 3:
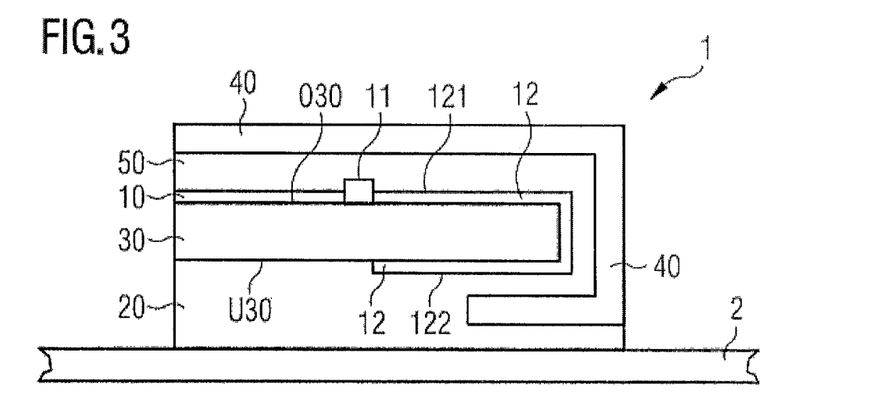
FIG. 3 shows a third embodiment of a transponder label resistant to high temperatures.

FIG. 3 shows a third embodiment of the transponder label resistant to high temperatures, which is suitable for being adhesively attached to a conductive subsurface and, proceeding from a starting temperature below 125° C., for example a starting temperature between 40° C. and 5° C., for being heated to high temperatures between 125° C. and 400° C., and for subsequent cooling down to the initial temperature. According to the embodiment of the transponder label 1 shown in FIG. 3, the antenna structure 12 is disposed both on the top side O30 of the spacer layer 30 and on the underside U30 of the spacer layer 30. The antenna structure 12 can have a first part 121 that is disposed on the top side O30 of the spacer layer 30, for example. Furthermore, the antenna structure 12 can have a second part 122, electrically or mechanically connected with the first part 121, which is disposed on the underside U30 of the spacer layer 30 and surrounded by the adhesive layer 20. The antenna structure 12 can be laterally folded around the spacer layer 30.

Figure 4:
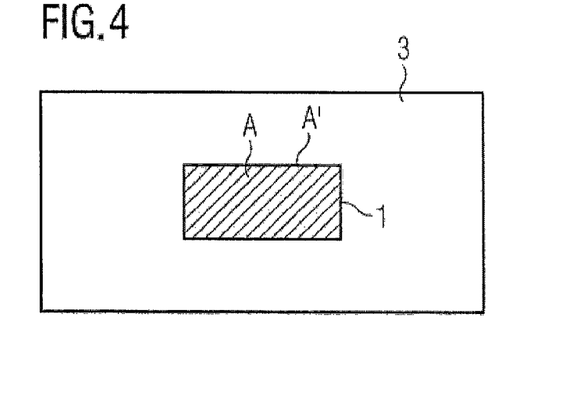
FIG. 4 is a top view of a transponder label resistant to high temperatures, applied to a conductive subsurface.

FIG. 4 shows a top view of the transponder label 1 resistant to high temperatures, according to one of the embodiments shown in FIGS. 1 to 3, which has been adhesively attached to the conductive subsurface 3. A surface area A of the label covers a surface area A' of the subsurface that lies underneath. With the label according to the invention, the occurrence of material shrinkage during heating to temperatures between 125° C. and 400° C. and during subsequent cooling down to the starting temperature of below 125° C., particularly to temperatures between 40° C. and 5° C., is prevented, so that the adhesively covered surface area A' of the subsurface 3 is covered by the transponder label, even when the label is exposed to the high temperatures or the temperature variations during heating and cooling, in the stated ranges.

To guarantee heat resistance, the spacer layer 30 has a material that is temperature-resistant in such a manner that the size of the surface area A of the transponder label 1, which covers the conductive subsurface 3 after the transponder label 1 has been adhesively attached, remains unchanged when the transponder label 1 or the conductive subsurface 3, after the label has been adhesively attached to the conductive subsurface, is heated from a starting temperature below 125° C. to a higher temperature between 125° C. and 400° C., and, after heating, is cooled down to the starting temperature.

Furthermore, the adhesive layer 20 has a material that is temperature-resistant in such a manner that loosening of the transponder label 1 and, in particular, loosening of the adhesive layer 20 from the conductive subsurface 3 is prevented when the transponder label 1 has been adhesively attached to the conductive subsurface 3 and the transponder label 1 or the conductive subsurface 3, after the label has been adhesively attached to the conductive subsurface 3, is heated from the starting temperature to the higher temperature, and, after heating, is cooled down to the starting temperature.

According to a further embodiment of the transponder label 1 resistant to high temperatures, the material of the adhesive layer 20 is temperature-resistant in such a manner that melting of the adhesive layer 20 is prevented when the transponder label 1 has been adhesively attached to the conductive subsurface 3, and, after having been adhesively attached to the conductive subsurface 3, is heated from the starting temperature to the higher temperature, and, after heating, is cooled back down to the starting temperature. The expansion coefficient of the material of the adhesive layer 20 and the expansion coefficient of the material of the spacer layer 30 can be coordinated with one another in such a manner that the occurrence of tension between the adhesive layer 20 and the spacer layer 30 is prevented when the transponder label 1 has been adhesively attached to the conductive subsurface 3 and the transponder label 1 or the conductive subsurface 3, after the label has been adhesively attached to the conductive subsurface 3, is heated from the starting temperature to the higher temperature, and, after heating, is cooled down to the starting temperature.

The material of the spacer layer 30 can particularly be configured in such a manner that the occurrence of a crack within the spacer layer 30 is prevented when the transponder label 1 has been adhesively attached to the conductive subsurface 3 and the transponder label 1 or the conductive subsurface 3, after the transponder label has been adhesively attached to the conductive subsurface, is heated from the starting temperature to the higher temperature, and, after heating, is cooled back down to the starting temperature. Furthermore, the adhesive layer 20 has a material by means of which the occurrence of a crack within the adhesive layer 20 is prevented when the transponder label 1 has been adhesively attached to conductive subsurface 3 and the transponder label 1 or the conductive subsurface 3, after the transponder label has been adhesively attached to the conductive subsurface 3, is heated from the starting temperature to the higher temperature, and, after heating, is cooled down to the starting temperature.

The material of the spacer layer 30 can be compressible flexible, in such a manner that the occurrence of tensions within the material of the spacer layer is prevented when the spacer layer is exposed to elevated temperatures, particularly temperatures in the range between 125° C. and 400° C., preferably temperatures in the range between 180° C. and 240° C., or when the label is first heated, starting from the starting temperature below 125° C., for example from a starting temperature between 40° C. and 5° C., to the elevated temperatures and subsequently cooled back down to the starting temperature. The heat-resistant materials used for the spacer layer 30 can contain polyamide and/or polytetrafluoroethylene (available under the trademark TEFLON) and/or polyurethane and/or an acrylate, for example. The spacer layer 30 can contain a foamed plastic, particularly a polyurethane foam, for example. When using a foamed plastic material for the spacer layer 30, the transponder arrangement 10 can be applied to the spacer layer 30 in such a manner that the chip 11 is disposed directly on the foam layer and therefore is protected against damage particularly well. Alternatively, the transponder arrangement 10 can also be disposed on the foamed spacer layer 30 in such a manner that the chip 11 faces outward, thereby achieving a greater reader range.

According to another possible embodiment, the spacer layer 30 can be configured as a panel that contains polyurethane. In this embodiment, the spacer layer 30 is formed from a non-foamed polyurethane that has elastic properties. The spacer layer 30 can be formed from an adhesive in foamed foam, for example an acrylate foam. The acrylate foam is a hardenable foam that is brittle after hardening. As a result, the transponder label has manipulation protection, because destruction-free lifting of the transponder label from the conductive subsurface is no longer possible.

The material of the adhesive layer 20 is configured to be heat-resistant for temperatures above 125° C., particularly for temperatures between 125° C. and 400° C. The material of the adhesive layer 20 can contain an acrylate, particularly a pure acrylate or a modified acrylate, and/or natural rubber. A sufficient temperature resistance to temperatures in the indicated temperature range between 125° C. and 400° C. or to temperature variations between the starting temperature and the elevated temperature particularly exists if the adhesive layer 20 has a thickness between 5 µm and 200 µm.

In the embodiments of the transponder label shown in FIGS. 1 to 3, the transponder protection layer 40 contains a material by means of which the occurrence of a crack within the transponder protection layer 40 is prevented when the transponder label 1 has been adhesively attached to the conductive subsurface 3 and the transponder label 1 or the conductive subsurface 3, after the label has been adhesively attached to the conductive subsurface, is heated from the starting temperature to the higher temperature, and, after heating, is cooled back down to the starting temperature. Furthermore, the adhesive layer 50 can have such a temperature-resistant material that loosening of the transponder protection layer 40 from the spacer layer 30 and the transponder arrangement 10 is prevented when the transponder label 1 has been adhesively attached to the conductive subsurface 3 and the transponder label 1 or the conductive subsurface 3, after the label has been adhesively attached to the conductive subsurface, is heated from the starting temperature to the higher temperature, and, after heating, is cooled back down to the starting temperature.

In the embodiment of the transponder label resistant to high temperatures shown in FIG. 2, the adhesive layer 70 contains a temperature-resistant material by means of which loosening of the paint protection layer 60 from the transponder protection layer 40 is prevented when the transponder label 1 has been adhesively attached to the conductive subsurface 3 and the transponder label 1 or the conductive subsurface 3, after the label has been adhesively attached to the conductive subsurface, is heated from the starting temperature to the higher temperature, and, after heating, is cooled back down to the starting temperature. The adhesive strength of the adhesive layer 70 between the paint protection layer 60 and the transponder protection layer 40 is lower than the adhesive strength of the adhesive layer 20 between the conductive subsurface 3 and the spacer layer 30.

With the transponder label resistant to high temperatures as indicated, a transponder label is made available that can be used for marking products having conductive surfaces, which are exposed to elevated temperatures, for example during a production process. The transponder label resistant to high temperatures can be used, because of the configuration, as described, of the adhesive layer 20, the spacer layer 30, the transponder protection layer 40, the adhesive layer 50 and, if applicable, the paint protection layer 60 and the further adhesive layer 70, particularly for marking products having a conductive surface 3, which, after the transponder label has been adhesively attached, are first painted with a paint and, during a subsequent drying process of the paint, are heated to temperatures above 125° C., particularly to temperatures between 125° C. and 400° C., and subsequently cooled back down to their starting temperature. By means of the selection of the indicated materials of the different layers of the transponder label resistant to high temperatures, it is ensured that no tensions or cracks occur in the individual material layers due to the influence of the high temperatures or temperature variations, and that furthermore, no material shrinkage occurs, as a result of which paint-free locations of the conductive subsurface would occur during the drying process, if the transponder label were to retract from the subsurface.

Figure 5A:
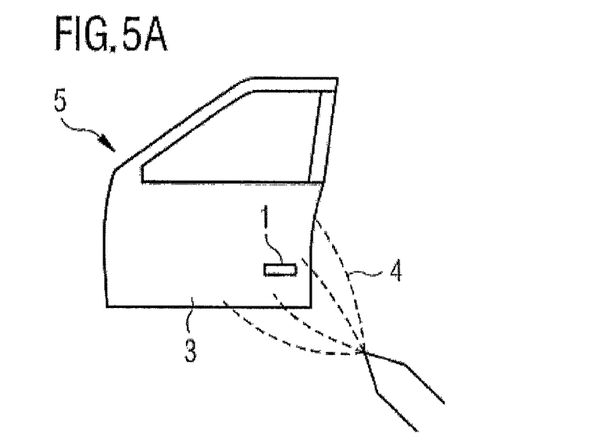
FIG. 5A shows a painting step of a method for marking a conductive subsurface to be painted with a transponder label.
Figure 5B:
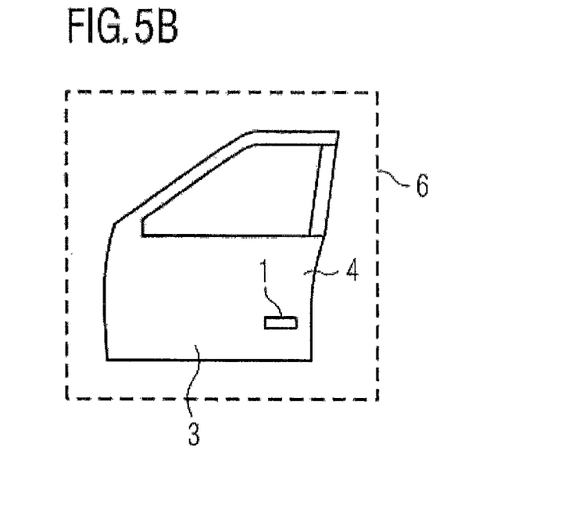
FIG. 5B shows a drying step of a method for marking a conductive subsurface to be painted with a transponder label.

FIGS. 5A and 5B show a possible use of the transponder label 1 resistant to high temperatures in a method for marking a conductive subsurface to be painted. For the method, the transponder label 1 resistant to high temperatures, according to one of the embodiments indicated above, is made available. As shown in FIG. 5A, the transponder label 1 is adhesively attached to a conductive subsurface 3 to be painted, for example to a car body part 5 of a vehicle body. For this purpose, the transponder label 1 can be adhesively attached to the conductive subsurface 3 by means of the heat-resistant adhesive layer 20. Subsequently, application of a paint layer 4 to the conductive subsurface 3 takes place. In this connection, not only the conductive subsurface 3 but also the transponder label 1 is covered with the paint layer 4.

FIG. 5B shows the painted part of the car body 5, for example a door frame, as the conductive subsurface, to which the transponder label 1 has been adhesively attached before the painting procedure. The conductive surface 3 is covered by the paint layer 4. The transponder label 1, which has been adhesively attached to the surface 3, is covered with the paint layer 4. The paint layer 4 is heated by means of heating in a drying space 6, for example a high-temperature oven, to a temperature between 125° C. and 400° C., preferably to a temperature between 180° C. and 240° C., dried and subsequently cooled back down to the starting temperature below 125° C., for example a temperature between 40° C. and 5° C., particularly to room temperature of approximately 23° C. By means of the structure of the transponder label as described, it is guaranteed that the materials of the label do not shrink during cooling, in such a manner that a surface area of the conductive subsurface that was adhesively covered before painting is exposed again.

If the transponder label 1 contains the paint protection layer 60, the paint protection layer 60 can be pulled off from the transponder protection layer 40 after the paint layer 4 has dried. If the transponder protection layer has an inscription, for example a laser inscription or a printed inscription, the inscription of the label can thereby be exposed after the paint 4 has dried.

Although only a few embodiments of the present invention have been shown and described, it is to be understood that many changes and modifications may be made thereunto without departing from the spirit and scope of the invention.

What is claimed is:

1. A temperature-resistant transponder label comprising:
  (a) a transponder arrangement having a chip and an antenna structure connected to the chip;
  (b) a first adhesive layer for adhesively attaching the transponder label to an electronically conductive subsurface; and
  (c) a spacer layer for spacing the transponder arrangement apart from the conductive subsurface, wherein the spacer layer has an underside, the first adhesive layer is disposed on the underside, and the transponder arrangement is disposed on the spacer layer; wherein the spacer layer has a spacer layer material that is temperature-resistant so that a surface area of the transponder label covering the conductive subsurface after the transponder label has been adhesively attached to the conductive subsurface has a size that remains unchanged following heating of the transponder label from a starting temperature of from 5° to a temperature less than 125° C. to a higher temperature between 125° C. and 400° C. and, after heating, cooling of the transponder label to the starting temperature; and wherein the first adhesive layer has a first adhesive layer material that is temperature-resistant so that loosening of the first adhesive layer from the conductive subsurface is prevented when the transponder label has been adhesively attached to the conductive subsurface and the transponder label, after having been adhesively attached to the conductive subsurface, is heated from the starting temperature to the higher temperature, and, after heating, is cooled down to the starting temperature.

2. The transponder according to claim 1, wherein the first adhesive layer material is temperature-resistant so that melting of the first adhesive layer is prevented when the transponder label has been adhesively attached to the conductive subsurface, and, after having been adhesively attached to the conductive subsurface, is heated from the starting temperature to the higher temperature, and, after heating, is cooled down to the starting temperature.

3. The transponder label according to claim 1, wherein the first adhesive layer material has an adhesive layer material expansion coefficient and the spacer layer material has a spacer layer material expansion coefficient and the adhesive layer material expansion coefficient and the spacer layer material expansion coefficient are coordinated with one another so that a tension between the first adhesive layer and the spacer layer is prevented, when the transponder label has been adhesively attached to the conductive subsurface, and, after having been adhesively attached to the conductive subsurface, is heated from the starting temperature to the higher temperature, and, after heating, is cooled down to the starting temperature.

4. The transponder label according to one of claim 1, wherein the spacer layer material is configured so that a crack within the spacer layer is prevented when the transponder label has been adhesively attached to the conductive subsurface, and, after having been adhesively attached to the conductive subsurface, is heated from the starting temperature to the higher temperature, and, after heating, is cooled down to the starting temperature.

5. The transponder label according to claim 1, wherein the spacer layer material contains at least one of a polyamide, a polytetrafluoroethylene, a polyurethane, and an acrylate.

6. The transponder label according to claim 1, wherein the spacer layer is configured as a panel that contains polyurethane.

7. The transponder label according to claim 1, wherein the first adhesive layer material contains at least one of an acrylate and a natural rubber.

8. The transponder layer according to claim 7, wherein the acrylate is a modified acrylate.

9. The transponder label according to claim 1, wherein the first adhesive layer has a thickness between 5 µm and 200 µm.

10. The transponder label according to claim 1, further comprising:
a transponder protection layer disposed above the transponder arrangement for protecting the transponder arrangement; and
a second adhesive layer that is disposed between the spacer layer and the transponder protection layer;
wherein the transponder protection layer contains a material that prevents a crack from occurring within the transponder protection layer when the transponder label has been adhesively attached to the conductive subsurface and, after being adhesively attached to the conductive subsurface, is heated from the starting temperature to the higher temperature, and, after heating, is cooled down to the starting temperature; and
wherein the second adhesive layer contains a second adhesive layer material that is temperature-resistant so that loosening of the transponder protection layer from the spacer layer and the transponder arrangement is prevented when the transponder label has been adhesively attached to the conductive subsurface, and, after having been adhesively attached to the conductive subsurface, is heated from the starting temperature to the higher temperature, and, after heating, is cooled down to the starting temperature.

11. The transponder label according to claim 10, further comprising:
a paint protection layer disposed above the transponder protection layer for protecting the transponder protection layer during painting over the transponder label; and
a third adhesive layer that is disposed between the paint protection layer and the transponder protection layer;
wherein the third adhesive layer contains a third adhesive layer material that is temperature-resistant so that loosening of the paint protection layer from the transponder protection layer is prevented when the transponder label has been adhesively attached to the conductive subsurface, and the conductive subsurface is heated from the starting temperature to the higher temperature, and, after heating, is cooled down to the starting temperature.

12. The transponder label according to claim 11, wherein the transponder protection layer is imprintable or inscribable by a laser.

13. The transponder label according to claim 11, wherein the first adhesive layer has a first adhesive strength, the second adhesive layer has a second adhesive strength and the third adhesive layer has a third adhesive strength;
wherein the third adhesive strength is lower than the second adhesion strength; and
wherein the third adhesion strength is lower than the first adhesion strength.

14. The transponder label according to claim 1, wherein the antenna structure has a first part that is disposed on a top side of the spacer layer, and a second part, electrically or mechanically connected with the first part, and is disposed on the underside.

15. A method for marking an electrically conductive subsurface to be painted with a transponder label, said method comprising the following steps:
(a) providing a temperature-resistant transponder label comprising a transponder arrangement having a chip and an antenna structure connected to the chip, a first adhesive layer for adhesively attaching the transponder label to an electrically conductive subsurface, and a spacer layer for spacing the transponder arrangement apart from the conductive subsurface, wherein the spacer layer has an underside, the first adhesive layer is disposed on the underside, and the transponder arrangement is disposed on the spacer layer, wherein the spacer layer has a spacer layer material that is temperature-resistant so that a surface area of the transponder label covering the conductive subsurface after the transponder label has been adhesively attached to the conductive subsurface has a size that remains unchanged following heating of the transponder label from a starting tempera of from 5° C. to a temperature less than 125° C. to a higher temperature between 125° C. and 400° C. and, after heating, cooling of the transponder label to the starting temperature, and wherein the first adhesive layer has a first adhesive layer material that is temperature-resistant so that loosening of the first adhesive layer from the conductive subsurface is prevented when the transponder label has been adhesively attached to the conductive subsurface and the transponder label, after having been adhesively attached to the conductive subsurface, is heated from the starting temperature to the higher temperature, and, after heating, is cooled down to the starting temperature;
(b) adhesively attaching the transponder label to the conductive subsurface to be painted via the first adhesive layer;
(c) applying a paint layer to the conductive subsurface; paint layer; and
(e) heating the paint layer to a temperature between 125° C. and 400° C. to dry the paint layer.

16. The method according to claim 15, further comprising:
providing the transponder label having the paint protection layer; and
removing the paint protection layer from the transponder label after drying the paint layer.

* * * * *